United States Patent
Vallee et al.

(10) Patent No.: US 9,633,221 B2
(45) Date of Patent: Apr. 25, 2017

(54) AUTHENTICATION METHOD AND DEVICES FOR ACCESSING A USER ACCOUNT OF A SERVICE ON A DATA NETWORK

(71) Applicants: Florian Vallee, Colombes (FR); Vincent Guerin, Colombes (FR)

(72) Inventors: Florian Vallee, Colombes (FR); Vincent Guerin, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/546,062

(22) Filed: Nov. 18, 2014

(65) Prior Publication Data

US 2015/0143474 A1    May 21, 2015

(30) Foreign Application Priority Data

Nov. 19, 2013    (FR) ...................................... 13 61372

(51) Int. Cl.
*H04L 29/00*    (2006.01)
*G06F 21/62*    (2013.01)
(Continued)

(52) U.S. Cl.
CPC ...... *G06F 21/6245* (2013.01); *H04L 63/0853* (2013.01); *H04L 63/0876* (2013.01); *H04L 63/18* (2013.01); *H04W 12/06* (2013.01)

(58) Field of Classification Search
CPC . G06F 21/6245; H04L 63/0876; H04L 63/18; H04L 63/0853; H04L 63/0838; H04L 63/1483; H04L 9/3228; H04L 63/0861; H04L 2209/56; H04L 63/1441; H04W 12/06

See application file for complete search history.

(56) References Cited

U.S. PATENT DOCUMENTS 8,316,237 B1 *  11/2012  Felsher et al. ................ 713/171
9,397,899 B2 *  7/2016   Venkatachalam ... H04L 41/5006
(Continued)

FOREIGN PATENT DOCUMENTS

| DE | 102011055297 A1 | 5/2013 |
| WO | 2013034865 A1 | 3/2013 |
| WO | 2013043035 A1 | 3/2013 |

OTHER PUBLICATIONS

French Search Report, dated Jul. 15, 2014, from corresponding FR application.

*Primary Examiner* — Don Zhao
(74) *Attorney, Agent, or Firm* — Young & Thompson

(57) ABSTRACT

An authentication method for accessing a user account of a service (28) on a data network (26), includes the following steps:

reception (E20) by the service (28) of a request from a consulting device (10) for the service (28), the request including a first authentication information element, reception (E60) by the service (28) of an information element sent by an authentication security device manager (34), the information received by the service (28) being based on a second authentication information element originating from a security device (16; 18) associated with the user account, and authentication by the service (28), based on the first authentication information element and the information received from the authentication security device manager (34).

17 Claims, 2 Drawing Sheets

(51) Int. Cl.
*H04L 29/06* (2006.01)
*H04W 12/06* (2009.01)

(56) References Cited

U.S. PATENT DOCUMENTS

| | | | |
|---|---|---|---|
| 2007/0199053 A1* | 8/2007 | Sandhu | G06F 21/31 726/4 |
| 2008/0010673 A1* | 1/2008 | Makino et al. | 726/6 |
| 2009/0235339 A1* | 9/2009 | Mennes | G06F 21/33 726/5 |
| 2009/0259848 A1* | 10/2009 | Williams | H04L 63/0838 713/168 |
| 2010/0199086 A1* | 8/2010 | Kuang et al. | 713/155 |
| 2010/0303230 A1* | 12/2010 | Taveau | G06Q 20/02 380/30 |
| 2011/0055585 A1* | 3/2011 | Lee | H04L 9/0844 713/183 |
| 2013/0024374 A1* | 1/2013 | Weiss | G06F 21/32 705/42 |
| 2013/0159195 A1* | 6/2013 | Kirillin et al. | 705/71 |
| 2013/0179954 A1* | 7/2013 | Bidare | H04L 63/18 726/7 |
| 2014/0020073 A1* | 1/2014 | Ronda | G06F 21/31 726/7 |

* cited by examiner

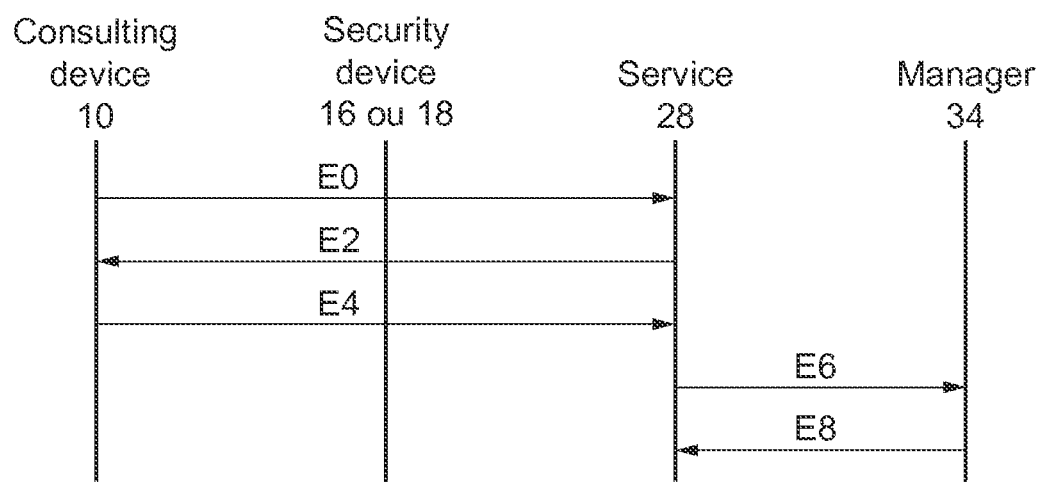

AUTHENTICATION METHOD AND DEVICES FOR ACCESSING A USER ACCOUNT OF A SERVICE ON A DATA NETWORK

FIELD OF THE INVENTION

The invention relates to an authentication method for accessing a user account of a service on a data network, a device implementing such a service, and a security device manager. It applies, in particular, to multifactor authentication of a user for accessing such a user account.

CONTEXT OF THE INVENTION

Services hosted on a data network (e.g. an Internet network) and accessible by a user from a consulting device or terminal connected to this data network are increasingly numerous.

This consulting device may be a personal computer, a smartphone, a tablet which is a personal computer including a touch screen and typically lacking a keyboard, or any other type of terminal connected to a communication network and allowing a user to interact with the service.

A service of this type is a package of software programs hosted on one or more servers connected to the data network. This software package is programmed to receive requests originating from the consulting device and to respond to them in such a way as to provide the service concerned. This service is, for example, a banking service, or a social network.

Access to a service of this type may require an authentication of the consulting device user. In this case, the service typically operates in collaboration with a database of users or user accounts.

In order to access the service, the user is therefore invited to supply one or more authentication information elements linked to one of the user accounts of the database associated with the service. Once authenticated, the user can, for example, access his bank account if the service is a bank, or his personal profile when the service is a social network.

The authentication may require the input by the user of a secret information element known to said user, for example a password associated with the user account of the user. In this case, the authentication is valid only if the secret information matches the information recorded for the user account in question in the database associated with the service.

However, the conventional authentication of a user by means of a secret information element is sometimes insufficient to guarantee the security of access to the service.

For example, it is very common for a user to use the same information, typically the same password, to protect his access to various services not necessarily having any link between them. In the event of discovery of this information, a malicious entity can therefore access this/these service(s) by passing itself off as the user by means of the password.

Multifactor authentication methods can be carried out in order to render the authentication of a user more complex and thus improve the security of access to a service of the aforementioned type.

These methods are mainly based on the joint use of a secret information element known to the user (e.g. a password) and information characterizing the user himself, typically biometric information (e.g. a fingerprint, iris of the eye) and/or information obtained via an object belonging to the user (e.g. code displayed on the user's terminal).

Unlike conventional authentication methods involving a single factor (using a single type of information) the discovery of one of these information elements of different types by a malicious entity does not generally allow access to the protected service.

However, the acquisition of this information, if it improves the security of the authentication, often requires action on the part of the user wishing to access the service, which can be detrimental to the user experience.

A need therefore exists to improve the security of existing authentication processes, in a manner which is as transparent as possible for the user.

SUMMARY OF THE INVENTION

The object of the present invention is therefore to overcome at least one of these disadvantages.

In this context, a first aspect of the invention relates to an authentication method for accessing a user account of a service on a data network, the method including the following steps:

reception by the service of a request from a device for retrieving said service, said request including a first authentication information element, reception by the service of an information element sent by an authentication security device manager, the information received by the service being based on a second authentication information element originating from a security device associated with the user account, and authentication by the service, based on the first authentication information element and the information received from the authentication security device manager.

The method according to the invention thus improves authentication security.

This is due to the fact that the authentication is based notably on two authentication information elements originating from two different devices, i.e. the consulting device and the security device associated with the user account.

Furthermore, the user experience is improved since the request sent by the security device triggers the acquisition of other information necessary for the multifactor authentication of the user, without the user having to propose or think for himself about sending this additional information.

The method thus appears to resemble a conventional authentication method for the user, whereas, in reality, the authentication is more secure. The request is not limited to the opening or starting of the service. It can also relate to the use of this service by the user from the consulting device.

Other characteristics of the method according to embodiments of the invention are described in the dependent claims.

In some embodiments, the authentication step can be carried out by the manager, notably in embodiments in which the service integrates the functionalities of the manager.

In particular embodiments of the invention, the second information element is received by the manager in response to a request sent by the manager to the security device.

Alternatively, the second authentication information element is sent spontaneously by the security device to the manager when the latter is connected.

In particular embodiments of the invention, said information received by the service corresponds to the second authentication information element sent by the security device.

The service itself thus implements the check of the first and second authentication information elements with a view to authenticating the user.

Alternatively, the manager checks the second authentication information element received from the security device and the information sent to the service by the manager corresponds to the result of this check.

The manager itself can thus check the second authentication information element and transmit the result (information) of this check to the service.

In particular embodiments of the invention, the second authentication information element includes an information element relating to the localization of the security device.

In particular embodiments of the invention, the localization information includes the address of a gateway between a local network and the data network hosting the service, said local network connecting the security device and the consulting device.

In these embodiments, the consulting device and the security device belong to the same local network, and can be characterized by the same public address (i.e. the gateway address) in relation to the data network hosting the service. Conversely, each of the devices connected to the local network will have its own private address in the local network, but this private address is not always known to the devices of the data network such as the manager or the service.

The address of the gateway between the local network and the data network therefore constitutes an additional authentication factor, which provides further security for access to the service.

Alternatively, the localization information may be a set of geographical coordinates or geographical reference points. This information may be given by a GPS position, through GSM triangulation (GSM localization) or Wi-Fi localization.

In particular embodiments of the invention, the second authentication information element includes a single-use code based on a secret stored in the security device.

In particular embodiments of the invention, the security device is connected to the manager by means of a persistent connection initiated by the security device.

Thus, in these embodiments, the manager and the security device can then communicate directly, independently from the consulting device from which the user seeks to authenticate himself.

In these particular embodiments of the invention, the association of the security device and the user account includes the following steps:

input on the consulting device of a code presented by the security device, transmission by the consulting device of the input code to the service, and activation of the association by the service.

These steps are intended to establish the prior association of the security device with the user account.

The entered code may be based on a unique identifier of the security device.

The code may thus enable the security device to be found, for example using a correspondence table. In particular, the entered code may correspond directly to the unique identifier of the security device. The code thus directly designates the security device.

Alternatively, the entered code may be based on a color code, or a number displayed on the security device, independent from the security device, or at least different from its identifier).

The input and transmission of this code to the service by the consulting device, following its retrieval from the security device, thus shows that the security device is in fact linked to the user account of the service.

The input may be text or voice (dictated). This code may be temporary, for example displayed on the security device, or alternatively permanent, for example printed or etched on the security device.

The code entered and received by the service can be recorded in association with the user account, in a database associated with the service.

The association of the security device and the user account may furthermore include the following steps:

transmission of the code received by the service to a security device manager, and checking by the manager of the received code.

The association of the device with the user account is therefore all the more secure. Alternatively, the service itself can check the code in collaboration with a database which is associated with it.

The code checked by the manager can be recorded in association with a service identifier, in a database associated with the manager.

In these particular embodiments of the invention, the reception of the second authentication information element by the manager requires the confirmation of a user of the consulting device.

For example, it can add a user localization factor in the authentication.

For example, the confirmation may consist in pressing a button on the other device, or in supplying a biological information element such as a fingerprint. This allows an additional factor to be taken into account (e.g. validity of the fingerprint, retinal scan or the like) in order to authenticate the user.

The biometric validation provides an additional confidence level, notably proving that the user is present at the time of transmission of the authentication information.

For example, it can add a user localization factor in the authentication.

A second aspect of the invention relates to a device implementing a service on a data network, the device including:

means for receiving a request from a consulting device of said service, said request including a first authentication information element, means for receiving an information element sent by an authentication security device manager, the information received by the service being based on a second authentication information element originating from a security device associated with the user account, and authentication means, based on the first authentication information element and the information received from the authentication security device manager.

a third aspect of the invention relates to an authentication security device manager for accessing a user account of a service on a data network, including:

means for receiving an authentication information element originating from a security device, and means for transmitting an information element to the service, based on the second authentication information element.

A security device manager of this type is typically a server hosted on the data network, capable of managing a fleet of security devices, linked to the user accounts of one or more services similarly hosted on the data network.

The exchanges between the security device and the manager, and/or between the service and the manager, and/or between the service and the consulting device may be compliant with the ISO 7816 standard (APDU frames).

The security device may, for example, be a security companion equipped with a user interface (for example LEDs), a chip card or UICC (Universal Integrated Circuit Card) according to the ETSI TR 102 216 standard, or a smartphone running a secure application.

The security device may include an integral or detachable secure element.

The particular advantages, aims and characteristics of the devices according to the different aspects of the invention are similar to those of the aforementioned method.

In one particular embodiment, the different steps of the aforementioned method are determined by computer program instructions.

Consequently, the invention also relates to a computer program on an information medium, this program being capable of being implemented by a microprocessor, this program including instructions suitable for carrying out steps of the method as mentioned above.

This program can use any programming language and can be in the form of source code, object code or intermediate code between source code and object code, such as in a partially compiled form, or in any other desirable form, for example a script.

The invention also relates to a microprocessor-readable information medium, including instructions of a computer program as mentioned above.

The information medium may be any given entity or device capable of storing the program. For example, the medium may include a storage medium, such as a ROM, for example a microcircuit ROM, or a magnetic recording means, for example a hard disk, a flash memory, or an optical recording means, for example a CD, DVD or Blu-ray.

Moreover, the information medium may be a transmissible medium such as an electrical or optical signal which can be routed via an electrical or optical cable, by radio or by other means. The program according to the invention may, in particular, be downloaded from a storage platform of an Internet network.

Alternatively, the information medium may be an integrated circuit into which the program is incorporated, the circuit being suitable for carrying out or for being used in the carrying out of the method in question.

The aforementioned information medium and computer program have characteristics and advantages similar to the method which they carry out.

BRIEF DESCRIPTION OF THE FIGURES

Other characteristics and advantages of the invention will also become apparent from the description below, illustrated by the attached figures which present example embodiments lacking any limiting character. In the figures:

FIG. 3 shows, in the form of a time chart, steps of the association of a security device with a user account, according to particular embodiments of the invention.

DETAILED DESCRIPTION OF THE INVENTION

Figure 1:
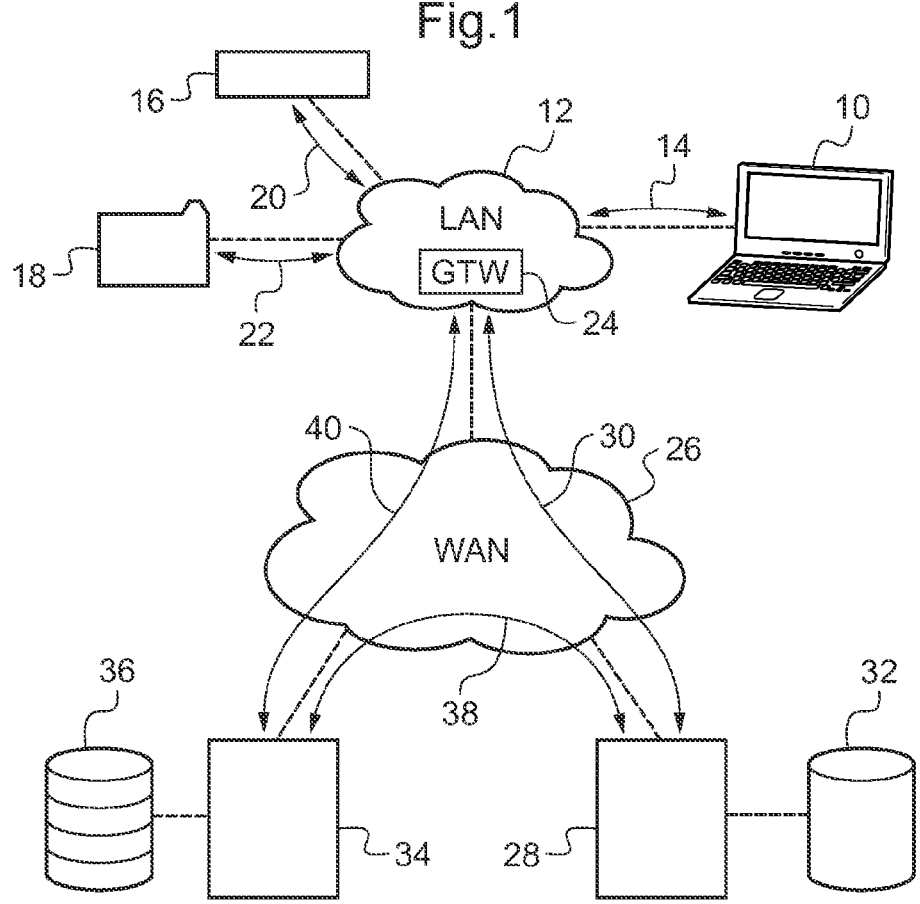
FIG. 1 shows a situation in which devices according to the different aspects of the invention corresponding to particular embodiments are shown.

The invention relates in general to the multifactor authentication of a user for accessing a user account of a service on a data network capable of hosting various services.

Here, the multifactor aspect of the authentication has the characteristic of bringing into play two different devices, linked by means of a local network. These two devices are typically a service consulting device, from which the user wishes to use the service, and a security device, responsible for further securing the user authentication.

In general, one aim of the present invention is to secure the user authentication by obtaining a second authentication information element to confirm a first authentication element obtained in the process of connecting the user to the service from his consulting device. This second authentication information element originates from the security device which was previously associated with the user account for the purpose of this securing of the authentication.

The operation of associating or linking the security device with the user account is implemented once only, prior to the authentication operations per se. This prior linkage keeps the authentication as transparent as possible for the user.

In some embodiments, the second authentication information element is obtained directly from the security device, by the service.

To do this, the security device can open a persistent connection to the service. This connection allows the service, for example, to send a request to obtain the second authentication information element and to receive the response thereto from the security device thus connected.

This persistent connection, when it is initiated by the security device, furthermore resolves the problems linked to the limited access (for example by means of a firewall) of devices of a local network to a more global network (here a data network).

Alternatively, the second authentication information element can be sent spontaneously by the security device to the manager or to the service. The spontaneous transmission of this second authentication information element may be periodic. For example, the security device can send the second information element regularly while it is active, in such a way that its disconnection is easily detectable since it corresponds to the interruption of the transmissions.

Alternatively, the transmission can be triggered by a particular event.

This particular event is, for example, an interaction between the user and the security device. For example, it may involve the pressing of a button by the user.

The second information element can be sent by the security device independently from any access request.

Alternatively, the particular event may correspond to the receiving of a service access request.

In some embodiments, the authentication information is confirmed if the source address of the response from the security device containing the second authentication information element matches the source address of the service access request transmitted by the consulting device. It can thus be checked that the security device and the consulting device used to access the service are connected to the same local network (LAN). The expected similarity of the source addresses is due to the fact that the different devices connected to the same local network typically communicate with the data network via the same gateway, and that said gateway typically implements a Network Address Translation (NAT) protocol.

Consequently, all messages originating from a device connected to the local network then have the same source address, corresponding to the address of the gateway on the data network. Here, the gateway address corresponds to the public address of the devices connected to the local network (here, at least the security device and the consulting device), allocated by the gateway access provider.

In general, the invention also covers the embodiments in which a localization information element localizing a secure device connected to the same local network as the security device is received by the manager or by the service as the second authentication information element of the user account.

This localization information may be something other than the address of a gateway between the local network and the data network. For example, it may entail geographical coordinates of the gateway, for example GPS coordinates or coordinates obtained through GSM triangulation or Wi-Fi localization.

In some embodiments, this second authentication information element is replaced or complemented by another authentication information element transmitted by the security device.

This may entail, for example, a single-use password generated by the security device or a biometric information element requested by the device from the user, for example a fingerprint or iris scan.

In this case, the user is involved with a view to further reinforcing service access security. In this case, the increase in access security due to this involvement is no longer totally transparent to the user, but can be justified for particularly sensitive services.

According to the embodiments, the service or the manager is thus responsible for checking the second security information element, for example by comparing the source address of the response message obtained from the security device with that of the access request obtained and/or transmitted by the service.

In generally, the term "access request" used below for reasons of simplicity is not limited to the requests sent by the consulting device to the service on the opening or starting of a communication session between the consulting device and the service. It also refers to the requests sent by the consulting device to the service throughout (or during) the use of this service by the user.

By means of the invention, a simple operation entailing prior association of the security device with the user account thus provides a simple and secure procedure for more securely authenticating a user wishing to access his user account of a service.

Another advantage of the invention is that the communications between the security device and the service are independent from the consulting device.

Thus, in the case where the consulting device is compromised, for example by a malicious virus, the additional authentication information elements (second authentication information element) supplied by the security device cannot be discovered or manipulated, since they never pass through the consulting device.

FIG. 1 shows a situation in which devices according to the different aspects of the invention conforming to particular embodiments are shown.

These devices can carry out an authentication method according to the invention, the steps of which are explained in the description below.

In FIG. 1, a consulting device 10 is connected to a local network 12 (Local Area Network—LAN) by means of a communication link 14.

This consulting device 10 is, for example, a portable computer or a mobile terminal (e.g. a telephone or touch tablet). Its architecture therefore includes at least the elements forming the conventional basic architecture of a PC or terminal. These known elements will not be further described.

According to some embodiments, the consulting device 10 may furthermore include a virtual or physical keyboard, a fingerprint sensor, a voice analysis/recognition module, a facial recognition module, a retinal analysis module or other modules enabling the supply (input) of authentication information by a user of this consulting device 10.

The local network 12 may, for example, be an Ethernet network and the communication link 14 may, for example, be an Ethernet cable.

Alternatively, the local network 12 may be a Wi-Fi network and the communication link 14 may then be a wireless connection.

The local network 12 may be of any other type, in the same way as the communication link 14. The local network 12 may be a Bluetooth network, a home network or personal network, or may correspond, for example, to a corporate Intranet network.

Other devices denoted 16 and 18 can also be connected to the local network 12 via communication links, denoted 20 and 22 respectively. These devices are authentication security devices, according to embodiments of the invention.

In general, the security device is typically compliant with the Common Criteria according to the international standard ISO/CEI 15408 (FIPS).

In this example, two security devices are shown, but the invention also covers cases with one or more security devices. In this example, the security device 16 is, for example, a security companion, for example equipped with LEDs.

This security companion 16 may include a secure element, for example suitable for carrying out instructions corresponding to steps of an authentication method according to embodiments of the invention.

These instructions are, for example, in the form of a JavaCard applet, or in the form of a piece of native code.

The security device 18 is, for example, a mobile telephone including in its memory a security application capable of being run by the telephone.

For example, the telephone 18 may contain a secure element, for example suitable for carrying out steps of an authentication method according to embodiments of the invention.

This secure element is, for example, a SIM (Subscriber Identity Module), USIM, or microSIM card.

The security devices 16 and 18 may also be equipped with a fingerprint sensor, a retinal analysis module, and/or a facial recognition module.

For reasons of simplicity, in the description below, the methods will refer equally to the security device 16 and the device 18.

The description below relating to the security device 16 with regard to the method applies to any device capable of playing the part of a user authentication security device by supplying or adding an additional authentication factor, having characteristics similar to those described with reference to the security devices 16 and 18.

The local network 12 may include or be connected to a gateway GTW 24 playing the part of a router for the data packets originating from the local network 12, destined for a device located in a network located outside this local network 12.

For example, the local network 12 is connected via the gateway 24 to a WAN (Wide Area Network) data network 26, for example the Internet network.

Alternatively, the gateway 24 can be connected directly to the data network 26 or can form part of this data network 26.

In order to carry out the routing of the data packets originating from the local network 12 and destined for a device of the data network 26, the gateway can use an NAT (Network Address Translation) technology.

The effect of using this technology is notably to mark the data packets transmitted by the gateway 24 with a source address corresponding to the address of the gateway 24.

From the perspective of the data network, the data packets transmitted by the devices connected to the local network 12 thus have a common source address.

In some embodiments, the invention provides for the use of this common characteristic as an additional authentication factor, as described in more detail below.

Furthermore, the local network 12 is connected to a device for accessing a service 28 via the gateway 24 and the data network 26, by means of a communication link 30.

A plurality of services can be available on the data network 26, but, for reasons of clarity, only one service 28 is shown. It is within the scope of the person skilled in the art to adapt the information relating to this service in the case where a plurality of services is available on this data network, or on different data networks.

The service 28 may include or may be linked to a database 32 in which user accounts are stored in association with authentication information, for example identifier/password pairs and also various information elements such as codes identifying devices associated with the user account, for example playing a part in the authentication, as will be described further below.

The consulting device 10 can potentially access the service 28 using communication links 14 and 30, and can access the gateway 24, subject to a positive authentication, as will be explained in the description below.

A security device manager 34 (or fleet manager) may also be connected to the data network 26. This manager is then responsible for managing a set of security devices for a set of users linked to one or more services. It is typically managed by the security device provider.

This manager allows the service to dispense with certain tasks relating to the security of the user accounts, such as, for example, obtaining certain authentication information, and possibly the processing thereof.

The corresponding services thus maintain their quality of service, despite the additional processing brought about by the improvement in the level of security of the authentication to access said services.

The manager 34 is characterized by a fixed domain (DNS) and, in collaboration with a database 36, enables the registration of the security devices connected to the data network 26 (e.g. 16 and 18) and also their connection status.

The security device manager 34 is furthermore connected to the service 28 by means of a communication link 38.

The associated database 36 thus stores device identifiers, but also service identifiers. As will be explained in more detail below with reference to the steps of methods according to the invention, this database 36 can also store codes for linkages between the security devices and user accounts of the identified services on the data network.

The security device manager 34 is also connected to the local network 12 by means of the link 40 with the gateway 24. When a device of the local network 12 wishes to access the data network, it can thus send a connection request with its identifier to the manager 34. In response, the manager 34 can store the (unique) identifier of this device in the database 36.

This identifier is, for example, the MAC address of the security device, and enables the security device to be found in the local network, despite the fact that the source address of the connection request is common to all the devices connected to the local network.

The manager can then store a linkage between this security device and a user account of a service of the data network, for example the service 28. The association of the security device with the user account will be described in detail below, notably with reference to FIG. 3.

In other embodiments, each service (e.g. the service 28) is designed to manage by itself the association of a security device with a user account.

In these embodiments, when a device of the local network 12 wishes to access the data network, it can send a connection request with its identifier to the service 28. And, in response, the service 28 can store the (unique) identifier of this device in the associated database 32, for example in association with the user account(s), where appropriate.

For reasons of simplicity, the description will focus below, in a non-limiting manner, on the case of the Internet data network. The different devices are shown notably by their IP address, and the exchanges are conformant with the Internet protocol. In this context, the service is a web service and can be accessed by means of a browser run on the consulting device from which a user wishes to access the web service.

The communications between the security devices 16 and 18 and the manager 34 or the service 28 are conformant with an asynchronous communication protocol requiring the maintenance of a persistent connection, such as, for example, the WebSocket or TCP protocol, or the XMPP protocol (Extensible Messaging and Presence Protocol) enabling the messages to be 'pushed' spontaneously to the recipient ("push" mode).

The exchanges between the consulting device 10 and the manager 34 (via the links 14 and 40), and/or between the consulting device 10 and the service 28 (via the links 14 and 30) and/or between the service 28 and the manager 34 (via the link 38) are effected, for example, via HTTP GET/POST requests.

The protocol enabling the exchanges between the consulting device 10 and the service 28 is therefore typically the HTTP protocol (Hyper Text Transfer Protocol) and the associated protocols such as HTTPS for the secure version.

Alternatively, a virtual discovery technique can be used to detect the security device 16 (or 18) if necessary. In this case, the communication channel 20-40 is open only when the security device 16 (or 18) is directly connected to a local bus connected (for example via a USB link) to the consulting device 10. The discovery technique can also use Wi-Fi or Bluetooth. However, the invention is not limited to communication exchanges of this type. Other communication protocols, which may be proprietary, may also be involved.

Figure 2:
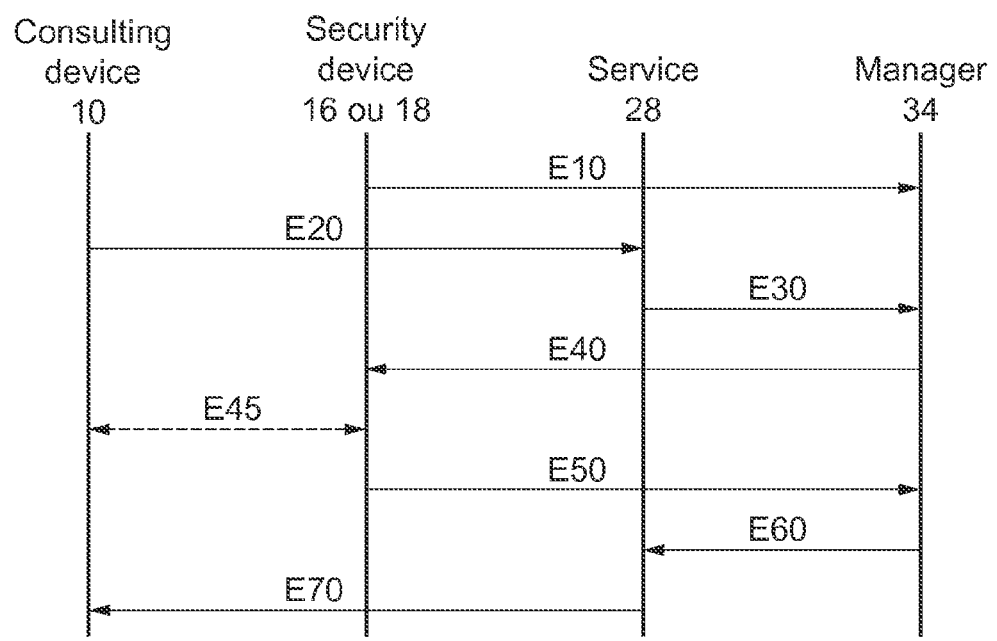
FIG. 2 shows, in the form of a time chart, the main exchanges taking place during the authentication method according to particular embodiments of the invention.

Steps of an authentication method according to the particular embodiments of the invention will now be described with reference to FIG. 2. Reference is made to the different devices shown in FIG. 1, which are suitable for jointly carrying out said method.

During an initialization step E10, the security device 16 (or 18) of the local network 12 contacts the security device manager 34 of the data network 26 in order to connect to this network.

In practice, an identifier (e.g. MAC address, or shared secret) of the security device 16 (or 18) is stored in the database 36 associated with the manager 34, and an "active" status is associated with it. The communication channel formed by the links 20 (or 22) and 40 is thus kept open.

This communication channel may be a dedicated channel, such that, when the communication protocol used allows it, the manager can send "push" notifications to the security device 16 (or 18) via this communication channel.

The security device may be equipped to send data spontaneously to the manager.

During a step E20, a user capable of having a user account of a service of the data network 26, typically the web service 28, formulates a request to access his user account.

Access to the service 28 is possible only insofar as the user authenticates himself successfully to the service.

In practice, the user can open a web page in a browser installed on the consulting device 10, this web page enabling the web service 28 to be contacted.

He supplies a first authentication information element via the web page and sends this first information element in a request to the service 28.

This first authentication information element originating from the user is such that the acquisition by the service 28 proves the involvement of the user in the supply of this information. It identifies the target user account and at least partially authenticates the user.

For example, this may involve a secret information element known to the user, typically a password which said user supplies via the web page.

The authentication information may also characterize the user himself in a biological manner. It may consist of a fingerprint, or may result from a facial recognition or an analysis of the user's retina.

This type of information may be acquired by suitable sensors and modules of the consulting device 10 from which the user attempts to access the service 28, for example a fingerprint sensor, a facial recognition module or a retinal analysis module.

The first authentication information element may also be, for example, an information element input by the user following its acquisition from a different device (security device 16 or 18).

This acquisition may be visual, for example by reading a displayed code (color code, drawing, word, etc.) on the other device, or inscribed (for example etched) on the other device.

The acquisition may also be audio, for example by listening to an audio message broadcast by the other device.

The input of the first authentication information element via the web page may thus be effected by means of a keyboard on the consulting device 10. Alternatively, the information may be dictated (voice input) if the consulting device 10 includes means suitable for voice recognition.

A combination of the two input modes is also covered by the invention.

On receiving the access request, the service 28 extracts the first authentication information and processes it using the associated database 32.

To do this, the service 28 can check the correspondence between the user account associated with an identifier present in the request from the consulting device and the authentication information (e.g. password, fingerprint, retina) in the database 32.

Alternatively, the service carries out this check later in the method, for example during the authentication step described below.

The service 28 can also extract the source address from the request from the consulting device in order to possibly use it subsequently as an additional user authentication factor.

As explained with reference to FIG. 1, this source address matches the address of the gateway 24 between the local network 12 from which the request originates (since the consulting device 10 is connected to this local network 12 via the link 14) and the data network 26 to which the service 28 is connected by means of the link 30.

The service 28 can then extract a code matching a linkage code also associated with the user account from the database 32.

In general, a linkage code represents the association between a user account of a service and a device associated with this account with a view to securing the user authentication.

It enables the security device to be defined, either directly (identifier), or indirectly (e.g. code which may correspond to an identifier, for example in a correspondence table).

A user account may have a plurality of associated devices, and therefore a plurality of associated linkage codes in the database associated with the service.

During a step E30, the service generates and sends an information request, aiming to recover an information element originating from the security device corresponding to the code. In this example, the information request is sent to the manager 34.

The information request sent to the manager may include the source address of the request by the consulting device, for the purpose of a subsequent checking of this address, as explained above.

The code enables the manager 34 to find the corresponding security device in order to obtain this information.

To do this, on receiving the information request, the manager 34 checks the presence of the linkage code in the database associated with it 36, and also checks that this code is indeed associated with the service 28.

One security device may be associated with a plurality of services, and for this reason it is appropriate for the manager to check that the code is indeed associated with the service 28, in order to avoid any interference with another service.

If that is the case, the manager 34 extracts from the database 36 the identifier of the device associated with the linkage code, here the security device 16 (or 18). If not, the method stops, the user is not authenticated and cannot access the service.

The registration of the linkage code, in other words the association of the security device and the user account, will be described in more detail with reference to FIG. 3.

The manager 34 can then possibly check the status of the connection associated with the identifier of the security device 16 (or 18), in such a way that, when the status of the connection is not active, the method stops, the user is not authenticated and cannot access the service.

In this example, the communication opened in step E10 is maintained and the status associated with the security device 16 (or 18) is "active".

During a step E40, the manager 34 sends an authentication request to the security device in order to obtain an authentication information element (second authentication information element) via the communication channel established in step E10.

This second authentication information element constitutes a "device factor" in the authentication, and its generation is a priori transparent to the user since the latter plays no part in the generation of this second authentication information element (unlike the first authentication information element inserted into the access request sent in step E20).

The second authentication information element is, for example, formed by the address of the security device (or 18) in the data network 26, i.e. the address of the gateway 24.

The request transmitted in step E40 may therefore simply consist in requesting an acknowledgement (confirmation) from the security device 16 (or 18) in order to make sure that the security device 16 (or 18) is still connected to the data network (via the gateway 24).

In other embodiments, a challenge-response mechanism can be implemented between the manager and the security device in order to make sure that the connection has not been maintained by a malicious device simulating the presence of the security device with a view to forcing the authentication.

Alternatively, the security device may spontaneously send authentication information to the manager, for example in a regular manner.

Alternatively, the second authentication information element may include a code identifying the security device 16 (or 18). This code may, for example, be a single-use code and/or a code with a time-limited validity (Temporary One Time Password—TOTP), generated within the security device 16 (or 18), for example by the secure element when the security device 16 (or 18) has an element of this type.

This code may possibly be based on a secret shared with the manager 34, the shared secret having been exchanged, for example, during the establishment of the connection in step E10. Alternatively, this secret may be shared with the service 28.

In practice, the secret may be established during a communication session initiation phase using a technique known by the name of Diffie-Hellman (DH). Alternatively, the secret may have been established by the security device provider, or by the service provider during a phase of association with the user account (see FIG. 3).

The secret may be stored, for example, in a secure element of the security device.

In some embodiments, the second authentication information element may include both the local network address and the code mentioned above.

During the optional step E45, the security device (or 18) may possibly request confirmation from the user (e.g. via the keyboard or via a fingerprint sensor) in order to send the response to the request to the manager 34.

This optional confirmation constitutes an additional factor in the authentication since it gives assurance to the manager that the user is located close to the security device 16 (or 18).

The security device 16 (or 18) responds during a step E50 to the authentication request transmitted by the manager 34.

Its response may take the form of an acknowledgement of which the source address is the address of the gateway 24 and/or a message including a temporary code (or any other information enabling the security device 16 to be authenticated to the manager 34).

On receiving the response from the security device (or 18), the manager can extract the source address from the response and check the correspondence between said source address and the source address of the access request received in the verification request in step E30.

Alternatively, the manager can transfer the source address as such of the response to the service 28 in order that the latter checks the correspondence with the source address of the access request.

In this case, the information required by the service in step E50 corresponds to the second authentication information element transmitted by the security device.

In the case where the security device 16 (or 18) has sent a code in order to authenticate itself, the manager 34 checks this code, for example by using the shared secret if the code is based on a secret of this type.

The manager 34 then sends a message (step E60) to the service 28 in order to inform it whether the addresses and the code have the expected values or not.

The service 28 authenticates or does not authenticate the user according to the content of the message. For example, if the message informs the service 28 that the addresses match and the code is valid, the service 28 authenticates the user and returns an access authorization during a step E70, allowing the user to access his user account, for example using the browser installed on his consulting device 10.

Alternatively, the manager can transmit the code directly to the service 28 in order that the latter itself checks the validity of the code.

In this case, the information required by the service in step E50 corresponds to the second authentication information element transmitted by the security device.

The invention also covers embodiments in which each service itself manages the security devices (without the manager 34). In these embodiments, the service itself carries out the steps carried out by the manager 34 in the example described above.

In particular, in these embodiments, the security device connects to the service 28 in step E10.

Following the reception of the access request (step E20) by the consulting device 10, the service 28 checks, during the step E30, in its database 32, that the security device is indeed associated with the user account.

If so, the service sends an information request directly to the security device in step E40 in order to obtain the second authentication information element. In step E50, the service receives the second authentication information element in response.

It checks its validity in step E60, for example in collaboration with the database 32, then proceeds with the authentication of the user when the authentication information elements all have the expected value.

In this case, the service 28 returns an access authorization during a step E70, allowing the user to access his user account, using the browser installed on his consulting device 10.

In all cases, the service 28 authenticates the user when the following factors are checked:
  validity of the first authentication information element contained in the access request received in step E20, and
  matching of the source addresses of the access request and the response of the security device 16 (or 18) to the request originating from the manager 34, and/or
  validity of the code transmitted by the security device 16 (or 18) where appropriate.

The invention also covers embodiments combining the different embodiments described above. For example, an embodiment in which the service implements the linkage of the user accounts with the security devices, but delegates the processing of the information to the manager, or an embodiment in which the linkage is implemented by the manager but the service processes all the authentication data, the manager not being responsible in this case for retrieving the required information from the different security devices.

FIG. 3 shows the prior association of the security device 16 (or 18) with a user account, according to embodiments of the invention. Reference is made here to the devices shown in FIG. 1.

The object of this association phase is to link a user account with one or more devices other than the device used by the user to access the service, in order to constitute an additional authentication factor and further secure the user authentication. This linkage may be implemented essentially by the service, or in collaboration with the manager.

This latter case is shown in FIG. 3, but the two cases will be described below.

During a step E0, the consulting device 10 sends a request to access the service 28 of the data network 26. This step is similar to step E20 described with reference to FIG. 2. This service 28 can be accessed only insofar as the user of the consulting device 20 authenticates himself successfully to this service. In practice, the user can open a web page in a browser installed on the consulting device 10, this webpage enabling the web service 28 to be contacted. He supplies an authentication information element via the web page and sends this information element in a request to the service 28.

This authentication information element may be similar to the first identification information element described with reference to FIG. 2, or may be of a different type. In all cases, it allows the service 28 to identify the user and its supply to the service 28 requires the involvement of the user.

In collaboration with the database 32, the service extracts and checks the authentication information element included in the request.

To do this, the service 28 can check the correspondence between the user account associated with an identifier present in the access request and the authentication information element (e.g. password, fingerprint, retina).

If successful, i.e. if the authentication information element actually corresponds to the user account in question, the service 28 transmits an access authorization to the consulting device 10, thus allowing the user to access his user account of the service 28.

At this stage, the multifactor authentication may not yet be activated for this user account. The parameters of the user account therefore need to be modified in order to activate this more secure authentication.

Alternatively, the account may already be parameterized with a multifactor authentication, in which case the idea is to further increase the level of security required to access the service.

In all cases, an additional authentication factor needs to be added, originating from a device (16 or 18) other than the consulting device 10 used to request the access to the service. For that to be possible, this other device (security device) must be linked or associated with the account of the user concerned.

To do this, the user enters on or dictates to the consulting device 10 a code linking the user account currently in use and the security device 16 (or 18). The (text or voice) input of the linkage code has been described in detail with reference to FIG. 2.

The linkage code may already be present in a database of the data network, for example the database 36 of the manager 34 and/or the database 32 of the service 28, in order to be checked by the manager 34 and/or the service 28 having the association itself.

During a step E4, the consulting device 10 transmits the entered or dictated linkage code to the service 28.

On receiving this linkage code, the service 28 generates a linkage activation request, destined for the manager 34. At this stage, the linkage code is not permanently stored in the database 32. It can be stored temporarily, for example in a random access memory linked to the service 28.

This activation request includes the linkage code received from the consulting device 10 in step E4 and is intended to activate the association between the security device 16 (or 18) and the user account currently in use.

This association enables additional authentication information originating from the security device 16 (or 18) to be taken into account in the authentication of the user account, during the next attempt by the user to connect to the service 28.

In other words, this linkage results in the taking into account of additional factors in the authentication, in such a way as to further secure the access to the service from the user account.

During a step E6, the service 28 transmits the activation request to the manager 34.

In the case where the linkage code has been sent in parallel to the manager 34, on receiving the activation request transmitted by the service 28 in step E6, the manager 34 can carry out an additional check by checking that the code received in the request indeed matches the code received elsewhere. If these codes do not match, the method stops and the linkage does not take place.

In particular embodiments, the manager 34 also checks that the security device 16 is indeed connected. In some embodiments, this check can prevent the association if the security device is not connected.

The manager 34 registers the linkage code in association with an identifier of the security device 16 (or 18) and an identifier of the service 28 having transmitted the activation request, in the associated database 36.

The manager 34 then returns (step E8) a message to the service 28 acknowledging that the linkage between the user account used and the security device 16 (or 18) is activated, in other words, that the security device is indeed associated with the user account.

On receiving this message in response to the activation request sent in step E6, the service 28 registers the linkage code in association with the user account in the database 32.

As an alternative to this example, the service itself can manage the association of the security device with the user account. To do this, the service itself activates the association then registers the necessary information in the associated database 32.

Typically, in this alternative, the linkage code corresponds directly to an identifier of the security device. Alternatively, the database 32 can store a table of correspondence between the linkage codes and the identifiers of security devices.

In order to authenticate a user of the user account, the service 28 will now need to obtain information authenticating the user from the consulting device 10 used by said user (see step E20 previously described), and also authentication information from the security device 16 (or 18) linked to the user account (see step E50 previously described).

The preceding examples are only embodiments of the invention, which is not limited thereto.

The invention claimed is:

1. An authentication method for accessing a user account of a service on a data network, the authentication method comprising:
    receiving, by the service, a request from a consulting device for said service, said request including a first authentication information element;
    receiving, by the service, an information element sent by an authentication security device manager, the information element received by the service being based on a second authentication information element originating from a security device associated with the user account, the second authentication information element being obtained directly from the security device without any user intervention; and
    authenticating, by the service, based on the first authentication information element and the information element received from the authentication security device manager,
    wherein the security device and the authentication security device manager communicate wirelessly directly, independently from the consulting device.

2. The authentication method according to claim 1, wherein the second authentication information element is sent spontaneously by the security device to the authentication security device manager when the authentication security device manager is connected.

3. The authentication method according to claim 2, wherein said information element received by the service corresponds to the second authentication information element sent by the security device.

4. The authentication method according to claim 2, wherein the authentication security device manager checks the second authentication information element received from the security device, and
    the information sent to the service by the authentication security device manager corresponds to the result of the check.

5. The authentication method according to claim 2, further comprising:
    sending, by the service, a request to obtain the second authentication information element; and
    receiving a response to the request from the security device.

6. The authentication method according to claim 1, wherein said information element received by the service corresponds to the second authentication information element sent by the security device.

7. The authentication method according to claim 1, wherein the authentication security device manager checks the second authentication information element received from the security device, and
    the information element sent to the service by the authentication security device manager corresponds to the result of the check.

8. The authentication method according to claim 1, wherein the second authentication information element includes information localizing the security device.

9. The authentication method according to claim 8, wherein the localization information includes the address of a gateway between a local network and the data network hosting the service, said local network connecting the security device and the consulting device.

10. The authentication method according to claim 1, wherein the second authentication information element includes a single-use code based on a secret stored in the security device.

11. The authentication method according to claim 1, further comprising:
    initiating, by the security device, the opening of a channel dedicated to communications with the authentication security device manager according to a communication protocol enabling messages to be pushed spontaneously over the dedicated channel; and
    maintaining the dedicated channel open while the security device is active.

12. The authentication method according to claim 11, further comprising pushing, by the security device, the second authentication information element periodically over the dedicated, secure channel.

13. The authentication method according to claim 12, wherein the pushing of the second authentication information element is performed regularly while the security device is active.

14. The authentication method according to claim 1, wherein the associating the security device and the user account comprises:
    receiving input on the consulting device of a code presented by the security device,
    transmitting, by the consulting device of the entered code to the service, and
    activating the association by the service.

15. A device implementing a service on a data network, the device comprising:
    one or more processors configured to
        receive a request from a consulting device of said service, said request including a first authentication information element,
        receive information sent by an authentication security device manager, the information received by the service being based on a second authentication information element originating from a security device associated with a user account, the second authentication information element being obtained directly from the security device without any user intervention, and
        authenticate, based on the first authentication information element and the information received from the authentication security device manager,
    wherein the security device and the authentication security device manager communicate wirelessly directly, independently from the consulting device.

16. An authentication security device manager for accessing a user account of a service on a data network, the authentication device manager comprising:
    one or more hardware processing devices configured to
        receive authentication information originating from a security device, the authentication information being obtained directly from the security device without any user intervention, and
        transmit an information element to the service, based on an authentication information element,
    wherein the security device and the authentication security device manager communicate wirelessly directly, independently from a consulting device that transmitted a request for the service.

17. A non-transitory microprocessor-readable information medium encoded with instructions of a computer program to cause a processing device to execute the method according to claim 1.

* * * * *